United States Patent Office 2,744,429
Patented May 8, 1956

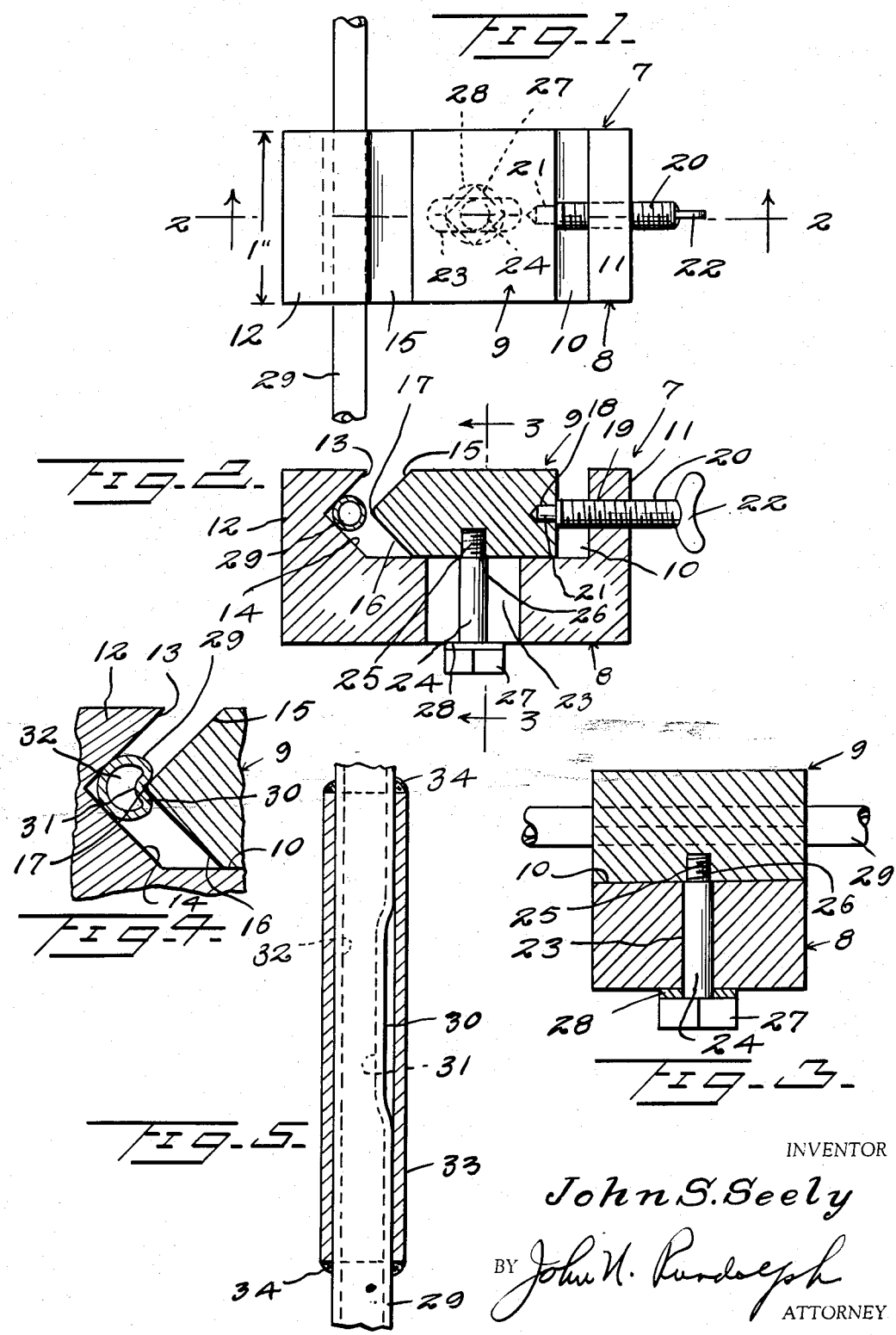

2,744,429

TOOL FOR AND METHOD OF FORMING A FLOW RESTRICTION IN A CONDUIT

John S. Seely, Augusta, Ga.

Application June 18, 1952, Serial No. 294,292

3 Claims. (Cl. 81—15)

This invention relates to a tool for use in accurately forming a restriction in a portion of the bore of a conduit for restricting the flow therethrough whereby an area of lower pressure may be created on the outlet side of the conduit as compared to the pressure between the restriction and the inlet end of the conduit.

More particularly, it is the primary object of the present invention to provide a tool especially adapted for use in forming a restriction in a capillary tube forming a part of the conduit system for the liquid refrigerant of an electric refrigerator for creating a low pressure area in the refrigeration system between the restriction and the evaporator, which is necessary for proper and efficient operation of such system.

More particularly, it is an aim of this invention to provide a tool which may be readily utilized for accurately forming a restriction to restrict the flow through a condiut system to a desired extent and which will eliminate the use of more expensive units, now commonly employed, for accomplishing the same result.

Still a further object of the invention is to provide a tool which may be manually operated to accurately form a restriction in the conduit to restrict the flow therethrough to a desired extent and which tool is so constructed that the conduit will not be collapsed thereby.

Various other objects and advantages of the invention will hereinafter become more fully apparent from the following description of the drawing, illustrating a preferred embodiment thereof, and wherein:

Figure 1 is a plan view showing the tool in an applied position;

Figure 2 is a longitudinal sectional view of the tool taken substantially along a plane as indicated by the line 2—2 of Figure 1;

Figure 3 is an enlarged cross sectional view taken substantially along a plane as indicated by the line 3—3 of Figure 2;

Figure 4 is an enlarged fragmentary longitudinal sectional view of a portion of the tool showing the movable jaw in an advanced position for forming a restriction in a conduit engaged by the tool, and Figure 5 is a fragmentary plan view partly in longitudinal section showing the restricted portion of the conduit formed by the tool.

Referring more specifically to the drawing, the restriction forming tool in its entirety is designated generally 7. The tool 7 includes a body section, designated generally 8, and a movable jaw section, designated generally 9.

The body section 8 includes an elongated block the upper portion of which is provided with a recess 10 which opens outwardly of the top and opposite sides of the block forming the body section 8. The recess 10 terminates near to but spaced from one end of the block to form an end wall 11. The recess 10 preferably terminates a slightly greater distance from the opposite end of the block to form an opposite end wall 12. Said end wall 12 has an inner side formed by oppositely inclined inwardly beveled surfaces comprising a top surface 13 and a bottom surface 14 which surfaces converge with respect to one another from the top and bottom, respectively, of the cavity 10 to form stationary jaw faces defining a transverse notch which extends from side to side of the tool 7 and which jaw faces are preferably disposed at approximately a right angle to one another. Accordingly, the end wall 12 of the body section 8 constitutes a stationary jaw of the tool 7.

The movable jaw tool section 9 comprises a block of the same width as the body section 8 and of a length substantially less than the length of the cavity 10. The block forming the movable tool section 9 is of a thickness or depth corresponding to the depth of the cavity 10 in which said movable section 9 is disposed for sliding movement toward and away from the end walls 11 and 12. The movable tool section 9 is provided with a beveled end disposed adjacent the end wall 12 formed by a downwardly and outwardly inclined upper end surface 15 and an upwardly and outwardly inclined lower end surface 16. Said end surfaces 15 and 16 converge outwardly with respect to one another and are preferably disposed at substantially a right angle. The converging ends of the surfaces 15 and 16 merge to form a forward edge 17 which is disposed in substantially the same plane as the merging inner edges of the stationary jaw faces 13 and 14 and which edge 17 extends from side to side of the movable section 9. The edge 17 combines with the beveled surfaces 15 and 16 to form a movable jaw of the tool 7. Said movable jaw section 9 is provided with a recess 18 which opens outwardly of the opposite end thereof and which is preferably disposed substantially axially of the section 9.

The end wall 11 has a threaded opening 19 extending therethrough through which a threaded bolt shank 20 threadedly extends. The bolt shank 20 is provided with a restricted unthreaded inner end 21 which seats rotatably in the recess or socket 18. The bolt shank 20 is preferably provided with a wing shaped head 22 at its opposite end which is spaced outwardly from the end wall 11. The bottom portion of the body section 8 is provided with an elongated slot 23 which extends longitudinally thereof and which opens outwardly of the underside of said body section 8 and into the cavity 10. An unthreaded bolt shank 24 of a diameter slightly less than the width of the slot 23 extends therethrough and is disposed for sliding movement longitudinally only of the slot 23. The bolt shank 24 has a threaded terminal portion 25 threadedly fitting into a downwardly opening threaded socket 26 formed in the intermediate portion of the movable section 9. A head 27 is formed on the opposite end of the bolt shank 24 below the body section 8. A washer 28 is preferably mounted on the bolt shank 24 against the bolt head 27 and bears against the underside of the body section 8. The bolt 24 slidably engages the slot 23 to permit the movable section 9 to slide longitudinally in the cavity 10 and prevents lateral movement of the section 9 relatively to the cavity 10. The bolt 24 also cooperates with the bolt 20 to prevent the movable section 9 from turning in the cavity 10.

From the foregoing it will be readily apparent that the bolt shank 20 may be readily turned in the threaded bore 19 in a direction for displacing it outwardly through the end wall 11 so that the tool 7 may be applied to a portion of the capillary tube 29 which is engaged in the notch formed by the stationary jaw faces 13 and 14, as illustrated in Figures 1 and 2. By then turning the bolt shank 20 in the opposite direction for advancing it inwardly through the threaded bore 19, the movable section 9 may be advanced from a retracted position adjacent the end wall 11 toward the stationary jaw 12 and the portion of the capillary tube 29 which is disposed in the notch thereof, to cause the transverse edge 17 of the movable jaw 15, 16 to engage against a longitudinal portion of the tube 29. The bolt shank 20 is then turned in the same direction as last mentioned to advance the movable section 9 toward the stationary jaw 12 to cause the movable jaw portion 17 to press a groove 30 in the exterior of the portion of the tube 29 which is engaged by said jaw portion 17 and which longitudinal groove 30 produces an internal restriction 31 in the bore 32 of the tube 29, as best illustrated in Figure 4. The movable section 9 is advanced slowly by turning of the bolt shank 20 to produce the restriction 31 of a desired size.

The tool 7 is primarily adapted for use in forming a restriction in the conduit system of an electric refrigerator in which the capillary tube 29 is inserted to form a part of the conduit system and is adapted to be located adjacent the inlet of the evaporator. The tube 29 is sufficiently small in cross section to offer some restriction to the flow of the liquid refrigerant. The restriction 31 is not formed by the tool 7 until the evaporator has had an opportunity to cool down with the compressor running so that the restriction can be accurately formed to accomplish a predetermined low pressure area in the refrigerating system between the restriction and the evaporator, not shown, that is, on the outlet side of the restriction. After the restriction of a desired size has been formed by the tool 7, a sleeve 33 which is loosely disposed on the tube 29 is slid into a position over the groove 30 thereof, after removal of the tool 7, and said sleeve 33 is secured in a shielding position over the groove 30 by soldering the ends of the sleeve to the tube 29, as indicated at 34 in Figure 5, so that the accurately formed restriction 31 cannot be tampered with and to prevent bending of the restricted tube portion and which would change the size of the restricted portion 31 of the tube bore. The restriction forming edge 17 of the movable jaw section 9 is preferably rounded to prevent cutting the tube 29 in forming the restriction. It will also be apparent that the stationary jaw faces 13 and 14 will support the tube at two circumferentially spaced points, as best illustrated in Figure 4, to prevent collapsing of the tube while the restriction 31 is being formed therein and so that a restricted bore portion of a desired cross sectional size may be accurately formed in the tube 29.

Various modifications and changes are contemplated and may obviously be resorted to, without departing from the spirit or scope of the invention as hereinafter defined by the appended claims.

I claim as my invention:

1. A tool for forming a flow restriction in a tubular conduit portion comprising an elongated body member having a cavity formed therein opening outwardly of the top and side walls of said body portion and defining an end wall at one end of said cavity provided with a threaded bore extending therethrough, said cavity forming an end wall at the opposite end thereof constituting a stationary tool jaw having inclined top and bottom surfaces on the inner side of said stationary jaw, said inclined surfaces merging inwardly from the top and bottom of said cavity and extending from side to side of said body portion, a block constituting a movable section of said tool loosely disposed in the cavity for movement longitudinally thereof, said block being of a width substantially corresponding to the width of said body portion and of a length substantially less than the length of said cavity, one end of said block being provided with outwardly converging substantially flat faces forming a movable jaw and defining a groove forming edge at the merging outer ends of said faces, said groove forming edge extending from side to side of said block, the opposite end of said block having a socket formed therein and opening outwardly thereof, and a feed screw extending threadedly through the threaded opening of the first mentioned end wall and provided with an unthreaded stem portion at its inner end rotatably disposed in said socket whereby rotation of the feed screw in one direction will advance the movable jaw toward said stationary jaw, said tool being adapted to be applied to a portion of a tubular conduit for positioning the conduit portion transversely in the cavity in a seated position against the faces of the stationary jaw and between the stationary jaw and movable jaw, said edge of the movable jaw being disposed at the level of the merging inner ends of the stationary jaw faces and substantially parallel thereto when the block is disposed in the cavity in engagement with the feed screw and resting on said body portion, whereby said edge of the movable jaw will press a groove into the tubular conduit when the movable jaw is advanced toward the stationary jaw for forming an elongated restricted bore portion in said conduit constituting a flow restrictor.

2. The method of forming a flow restrictor comprising applying compressive forces to at least three circumferentially spaced longitudinally elongated portions of a tubular conduit characterized by one of the forces being directed against an area of a lesser circumferential extent than the other forces for forming an elongated longitudinally extending exterior groove and internal rib in the tubular conduit whereby a bore portion of the tubular conduit is reduced in cross sectional area by the internal rib to form the flow restrictor, and the step of completely enclosing the tubular conduit portion in which the restrictor is formed in a rigid sleeve to prevent collapsing of said conduit portion.

3. A tool for forming a flow restriction in a portion of a tubular conduit comprising a first section having a tube engaging jaw, a second section provided with a tube engaging jaw, means connecting said second section to the first section for movement of the jaw of the second section toward and away from the jaw of the first section, actuating means connected to the tool sections and operable for moving the second section to cause the jaw thereof to be displaced toward or away from the jaw of the first section, the jaw of the first section having a jaw face constituting an elongated channel of substantially V-shaped cross section composed of substantially flat angularly disposed surfaces converging inwardly of the jaw relative to one another to form a bed, and said second section having an elongated jaw face disposed in opposed relation to the jaw face of the first section, said jaw face of the second section having a narrow elongated leading edge portion disposed substantially coplanar with and parallel to the bed of the jaw face of the first section for engaging an elongated portion of a tubular conduit disposed in the jaw face of the first section along a line spaced substantially equal distances circumferentially from longitudinal parts of the tubular conduit engaged by the two surfaces of the jaw face of the first section, whereby said leading edge of the second section will form a longitudinally elongated external indentation and internal restriction in the tubular conduit when the jaw of the second section is moved by said actuating means toward the jaw of the first section, the surfaces of the jaw face of the first section by engagement with circumferentially spaced parts of the tubular conduit preventing collapsing of the tubular conduit portion in which the internal restriction is being formed.

References Cited in the file of this patent

UNITED STATES PATENTS

| Number | Name | Date |
|---|---|---|
| 217,364 | Goss | July 8, 1879 |
| 279,020 | Ritchie | June 5, 1883 |
| 1,120,466 | Fegley et al. | Dec. 8, 1914 |
| 1,619,084 | Miller | Mar. 1, 1927 |
| 1,853,549 | Clark | Apr. 12, 1932 |
| 2,147,032 | Haury | Feb. 14, 1939 |
| 2,158,855 | Eby et al. | May 16, 1939 |
| 2,285,099 | Specht | June 2, 1942 |
| 2,285,275 | Harder | June 2, 1942 |
| 2,413,547 | Davidson | Dec. 13, 1946 |